United States Patent [19]

Marnett et al.

[11] Patent Number: 4,766,167
[45] Date of Patent: Aug. 23, 1988

[54] HYDROXY ACID ESTER PLASTICIZED URETHANE ELASTOMERS

[75] Inventors: Lawrence F. Marnett, Leawood; Joseph B. Kubec, Overland Park, both of Kans.

[73] Assignee: C. J. Patterson Company, Kansas City, Mo.

[21] Appl. No.: 100,290

[22] Filed: Sep. 23, 1987

[51] Int. Cl.$^4$ .............................................. C08L 75/04
[52] U.S. Cl. ................................... 524/310; 524/317; 524/759; 524/760; 524/769; 525/454; 528/49; 528/74.5; 528/76; 528/77; 528/80; 528/81
[58] Field of Search ............... 524/310, 317, 759, 760, 524/769; 525/454; 528/49, 74.5, 76, 77, 80, 81

Primary Examiner—Maurice J. Welsh
Attorney, Agent, or Firm—Hovey, Williams, Timmons & Collins

[57] ABSTRACT

A plasticized polyurethane elastomer prepared from the combination of a polyol and an isocyanate is disclosed wherein a sufficient amount of an alpha hydroxy acid ester of a hydroxy polyol plasticizer is incorporated in the elastomer to improve the physical properties of the elastomer. The plasticizing agent is represented by the formula $$R\text{---}[O\text{---}CH_2\text{---}CH_2]_n\text{---}O\text{---}[CH(V)]_m\text{---}CH(Y)\text{---}O\text{---}Z$$

wherein
R = HO—CH(X)—C(O)
X = H$_3$ or H
Y = H or CH$_3$ or CH$_2$OH or CH$_2$OR or CH$_2$OW or CH$_3$CH$_2$
Z = H or R or W
W = CH$_3$—[CH$_2$]$_1$—[CH=C]$_p$—C(O)
V = H or CH$_3$
n = 0 or 2
m = 1 to 3
l = 4 to 20
p = 0 to 3
l + 2p = 4 to 20.

The acid ester plasticizer may be added either to the polyol reactant component, a prepolymer prepared from a polyol and an isocyanate, the curing agent for the prepolymer, the prepolymer and curing agent combination, or to a one shot system containing an isocyanate, a polyol and a curing catalyst capable of effecting cross-linking of the poly and isocyanate upon application of heat thereto.

48 Claims, No Drawings

HYDROXY ACID ESTER PLASTICIZED URETHANE ELASTOMERS

BACKGROUND OF THE INVENTION

1. Field of the Invention

This invention relates to polyurethane elastomers plasticized and softened with alpha hydroxy acid esters of hydroxy polyols and methods of improving the plasticity of polyurethane elastomers by incorporation of a sufficient amount of such esters in the elastomer to modify the physical properties thereof.

2. Description of the Prior Art

Polyurethanes are obtained by the reaction of an ioscyanate with materials containing hydroxyl groups, e.g., polyesters, polyethers, castor oil, or simple glycols. These polymers may also contain urea groups resulting from the isocyanate reactions with amines or water.

In general, diisocyanates are used, that is compounds having two isocyanate groups: O=C=N—R—N=C=O. Most commercial urethane elastomers are based upon tolylene diisocyanate (TDI), methylene diphenyl isocyanate (MDI), or polymeric isocyanates (PMDI).

The polyol components are usually polyether or polyester based. Polyesters, such as polyethylene adipate or phthalate, are used and polyethers are low molecular weight macroglycols, usually based on polyalkylene oxides.

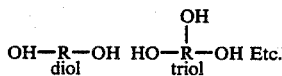

Because of the variety of raw materials which can be utilized to form urethanes, the polymers can be well suited for an individual application. In formulating products for these specific applications, additives can be used to improve specific properties. Plasticizers are employed to adjust the final hardness as well as the physical properties of the elastomer.

There are many plasticizing agents known to the art of polyurethane formulations. A plasticizer, by its nature, will soften a polymeric composition. In a polyurethane compound, a plasticizer can reduce hardness with resulting (1) lower tensile strength, (2) lower modulus values, (3) decreased tear strengths, and (4) improved elongation. Since the physical properties of a single polyurethane composition can be adjusted by selective plasticizer addition, stocking of fewer materials for a variety of applications is possible.

"Elastomers" from polyurethane resins as used herein may be defined as having elastic properties similar to those of vulcanized rubbers, both hard and soft, resist permanent deformation and have characteristics permitting use in the production of self-sustaining three-dimensional objects. Solid polyurethane elastomers can be milled, extruded, injection molded, calendared, cast, or otherwise processed into self-sustaining three-dimensional objects. Thus, elastomers are to be distinguished from films for coatings. The *Condensed Chemical Dictionary*, 10th Edition, Van Nostrand Reinhold Company, defines a film as being an extremely thin continuous sheet of substrate having a thickness no more than about 0.01 inch. A coating in the same publication is defined as a film or thin layer (assumedly of similar thickness) applied to a base substrate.

Various patents and publications over a long period of years have described a number of different alpha hydroxy acid esters of hydroxy polyols, but none are known to have suggested incorporation of these esters in polyurethane elastomers to plasticize and soften the resin formulation.

SUMMARY OF THE INVENTION

It has now been discovered that by incorporating an alpha hydroxy acid ester of a hydroxy polyol into polyurethane elastomers at levels from about 0.1 to about 50 parts per hundred (PHR) of the elastomer, a significant and desirable reduction in the hardness of the elastomer may be realized without proportional decrease in physical properties such as tensile and tear strength and elongation characteristics. Significantly less of the alpha hydroxy acid ester of a hydroxy polyol is required in the urethane elastomers than is the case with other plasticizers, resulting in substantial economic benefits.

The alpha hydroxy acid ester of a hydroxy polyol can be added during initial preparation of the polyol component forming a part of the urethane resin, to a urethane prepolymer, to the curing agent for the prepolymer, to a one shot urethane system or directly to the urethane formulation immediately prior to cure and forming of the resin into a three-dimensional object. This may be accomplished by incorporation of the alpha hydroxy acid ester of a hydroxy polyol in either the prepolymer formulation, a curing agent if used, in one of the reactants of the composition, or during manufacture of a prepolymer or of the entire elastomer which is thereafter sold to a customer for a specific use. The alpha hydroxy acid esters of a hydroxy polyol which are useful in plasticizing polyurethanes in accordance with this invention generally are liquids and therefore may be added directly into the liquid elastomer for blending therewith. However, if the plasticizing additive is initially in solid or semi-solid state, the additive can be elevated to a temperature to effect liquifaction thereof so that a homogeneous dispersion of the ester additive throughout the urethane formulation may be carried out by a simple blending procedure. Thereafter, it is only necessary to mold or otherwise form the urethane into a desired three-dimensional configuration.

DETAILED DESCRIPTION OF THE INVENTION

In a preferred embodiment of the invention, a plasticizer additive comprising an alpha hydroxy acid ester of a hydroxy polyol is added directly to the liquid polyurethane elastomer, which may be either a prepolymer, a formulation used as is which is sold to a molder for forming into a desired shape, or employed in the molding operation itself by incorporation of the additive into the resin as a part of the user's system.

Specifically, the plasticizing agent to be added to the polyurethane elastomer is a mono-, di- or tri-lactate or glycolate of a polyhydroxy alcohol having 1 to 4 carbon atoms where the alcohol contains more than one hydroxy group, or of the condensation polymers of polyhydroxy alcohols wherein the polymers contain at least two hydroxyl groups, or of fatty acid esters of polyhydroxy alcohols. In particular, best results have been obtained by use of mono- or di-lactates or mono-, or di-glycolates of ethylene glycol, propylene glycol, butylene glycol, tri-ethylene glycol or monoglycerides of fatty acids, or mono-, di-, or tri-lactates or mono-, di- or tri-glycolates of glycerol.

The plasticizer is an ester which is represented by the formula:

$$R\text{—}[O\text{—}CH_2\text{—}CH_2]_n\text{—}O\text{—}[CH(V)]_m\text{—}CH(Y)\text{—}O\text{—}Z$$

wherein
- $R = HO\text{—}CH(X)\text{—}C(O)$
- $X = CH_3$ or $H$
- $Y = H$ or $CH_3$ or $CH_2OH$ or $CH_2OR$ or $CH_2OW$ or $CH_3CH_2$
- $Z = H$ or $R$ or $W$
- $W = CH_3\text{—}[CH_2]_l\text{—}[CH=C]_p\text{—}C(O)$
- $V = H$ or $CH_3$
- $n = 0$ to $2$
- $m = 1$ to $3$
- $l = 4$ to $20$
- $p = 0$ to $3$
- $l + 2p = 4$ to $20$.

The alpha hydroxy acid esters of a hydroxy polyol may therefore either be a lactate wherein $X=CH_3$ or a glycolate wherein $X=H$. Glycerol di-lactate or di-glycolate esters are useful wherein $Y=CH_2OH$, $Z=R$, $V=H$, $n=0$ and $m=1$. Other glycerol esters include the glycerol tri-lactate or tri-glycolate additives wherein $Y=CH_2OR$, $Z=R$, $V=H$, $n=0$ and $m=1$. An ethylene glycol mono-lactate or mono-glycolate ester has the formula as represented wherein $Y=H$, $Z=H$, $V=H$, $n=0$ and $m=1$. An ethylene glycol di-lactate or di-glycolate ester is of the formula as represented wherein $Y=H$, $Z=R$, $V=H$, $n=0$ and $m=1$. 1,2 propylene glycol mono-lactate or mono-glycolate is useful wherein in the formula represented $Y=CH_3$, $Z=H$, $V=H$, $n=0$ and $m=1$. 1,2 propylene glycol dilactate or di-glycolate may be employed wherein the ester is represented by the formula wherein $Y=CH_3$, $Z=R$, $V=H$, $n=0$ and $m=1$. The 1,3 propylene glycol mono-lactate or mono-glycolate is represented by the formula as indicated wherein $Y=H$, $Z=H$, $V=H$, $n=0$ and $m=2$. The 1,3 propylene glycol dilactate or di-glycolate is represented by the defined formula wherein $Y=H$, $Z=R$, $V=H$, $n=0$ and $m=2$. The 1,2 butylene glycol mono-lactate or mono-glycolate ester has the formula as represented wherein $Y=CH_3CH_2$, $Z=H$, $V=H$, $n=0$ and $m=1$. A 1,3 butylene glycol mono-lactate or mono-glycolate ester has the formula as represented wherein $Y=CH_3$, $Z=H$, $V=H$, $n=0$ and $m=1$. A 1,4 butylene glycol mono-lactate or mono-glycolate ester has the formula as represented wherein $Y=H$, $Z=H$, $V=H$, $n=0$ and $m=3$. A 2,3 butylene glycol mono-lactate or mono-glycolate ester may be employed which has the formula as represented wherein $Y=CH_3$, $Z=H$, $V=CH_3$, $n=0$ and $m=1$. The 2,3 butylene glycol di-lactate or di-glycolate ester may be employed which has the formula as represented wherein $Y=CH_3$, $Z=R$, $V=CH_3$, $n=0$ and $m=1$. The tri-ethylene glycol mono-lactate or mono-glycolate is useful wherein in the formula as indicated $Y=H$, $Z=H$, $V=H$, $n=2$ and $m=1$. The tri-ethylene glycol di-lactate or di-glycolate has the formula as indicated wherein $Y=H$, $Z=R$, $V=H$, $n=2$ and $m=1$. A mono-lactate or mono-glycolate of a fatty acid di-glyceride may be used wherein in the formula as represented $Y=CH_2OW$, $Z=W$, $V=H$, $n=0$ and $m=1$.

Similarly, the acid ester may be a mono- or di-lactate or mono- or di-glycolate of a glycerol fatty acid wherein $Y=CH_2OW$, $Z=H$ or $R$, $V=H$, $n=0$ and $m=1$. A preferred acid ester is the stearic acid derivative wherein $l=16$ and $p=0$. However, the fatty acid may be saturated or unsaturated and therefore in the preceding generic structural formula, $l=4$ to $20$, $p=0$ to $3$ and $l+2p=4$ to $20$.

Although the ratio of a defined acid ester plasticizer to polyol-isocyanate resin may be varied depending upon the physical parameters desired for the final urethane elastomer, or to modify the properties of the particular polyol or isocyanate reactants, good results have been obtained by maintaining the plasticizer in a range of about 0.1 to about 50 parts per hundred (PHR) by weight of the resin. It has further been found that improved plasticization of urethane polymers may be obtained at a reasonable cost when the ratio of plasticizer to resin is maintained within the range of about 0.1 PHR to about 20 PHR on a weight basis. Usually, a plasticizer to resin ratio of about 0.5 PHR to about 2 PHR on a weight basis will give preferred results especially in the case of one-shot urethane systems where hardness is desired in the 10 to 30 Shore A durometer range. However, where urethane elastomer hardness is desired in the Shore D durometer range of 40 to 70, best results have been found to result from use of an alpha hydroxy acid ester of a hydroxy polyol as described wherein the addition is in the 10 PHR to 15 PHR range (weight basis).

The alpha hydroxy acid esters of a hydroxy polyol referred to above are virtually all liquids and therefore may be added directly to the prepolymer urethane formulation or a component of such formulation and blended therewith. If the ester is in a solid or semi-solid state, the combination of the acid ester additive and the reactant or resin should be heated to a temperature only sufficient to assure liquification of the plasticization agent and preferably no more than to a temperature level in the range of 120° F. to 200° F. and most desirably in the range of 150° F. to 175° F.

If the intended use of the alpha hydroxy acid ester of a hydroxy polyol plasticizer is in one-shot urethane formulations, the formulator or ultimate user may simply add the acid ester to the polyol component of a urethane resin system. The mixture of the acid ester additive and polyol is stirred, agitated, or otherwise mixed to effect thorough dispersion of the acid ester in the polyol. Thereafter, the polyol containing the acid ester plasticizer is combined in suitable proportions with the isocyanate component of the urethane system, and the admixture blended to assure preparation of a homogenous mixture. Such blending may be carried out by admixing of the ingredients in a suitable mixer, or it may be accomplished under pressure in the equipment used to mold products into self-sustaining elastomers.

Molding of self-sustaining three-dimensional urethane elastomers by molders is normally accomplished using either so-called one shot polymers which cure in a mold by virtue of the fact that the liquid polymeric material contains a catalyst that effects cross-linking of the resin in response to increase in temperature of the polymer, or the molder utilizes a prepolymer which is combined with a curing agent before introduction into the mold. In the case of a prepolymer, a polyol is combined with an isocyanate and usually other additives that effect the characteristics of the final product. The curing agent is then added to the prepolymer by the molder immediately prior to introduction of the polymer into the molding equipment.

The plasticizer of the present invention comprising an alpha hydroxy acid ester of a hydroxy polyol may be added to the urethane constituents at a number of different points in the processing chain, but best results are obtained if such addition is accomplished by addition thereof to the components of the polymer rather than in the final composition immediately before introduction thereof into a mold. For example, the manufacture of the polyol constituent of the urethane may add the alpha hydroxy acid ester of a hydroxy polyol plasticizer to the polyol during preparation thereof, either as the polyol is synthetized, or during purification or concentration thereof. Similarly, the alpha hydroxy acid ester of a hydroxy polyol plasticizer may be introduced into the prepolymer which a supplier prepares by combining a polyol with an isocyanate. This prepolymer containing the plasticizer of this invention along with other additives which the supplier may incorporate into the composition before delivery of the prepolymer to its customers. The alpha hydroxy acid ester of a hydroxy polyol plasticizer may further be combined with a curing agent which is designed to be added to a prepolymer immediately before molding of the urethane resin. Finally, the molder may add the plasticizer of this invention to the combination of curing agent and prepolymer immediately before molding of the urethane resin, or the molder may add an additional amount of the alpha hydroxy acid ester of a hydroxy polyol plasticizer to the curing agent, the prepolymer or after combination of the prepolymer and curing agent, even if such constituents already have a quantity of the plasticizer therein, if the molder elects to further modify the softness of the elastomer to be molded from the urethane polymeric material.

One shot elastomeric systems which contain a catalyst that is active to cure the urethane resin upon application of an adequate amount of heat thereto, may be plasticized by addition of an alpha hydroxy acid ester of a hydroxy polyol as described herein by addition of the plasticizer to the liquid resin system at any time prior to heating thereof. Where a quantity of the plasticizer has been added to the one shot system before supply thereof to the user, the molder can add additional amounts of the plasticizer to the resin system before molding thereof, if he finds it necessary or desirable to further modify the characteristics of the three-dimensional elastomer to be molded from the urethan resin.

In most instances, the ester plasticizing agent is in liquid form permitting blending thereof into the polyol, prepolymer, curing agent, or one shot system as the case may be, but if the plasticizing agent is initially in solid or semi-solid state, the mixture may be heated to the defined level sufficient to liquify the acid ester plasticizer and thus assure thorough dispersion of such plasticizer in the resin reactant or curing agent. The prepolymer and curing agent mixture containing the plasticizing ester, or the one shot urethane resin system incorporating the plasticizer may be molded in a suitable vessel, pressure chamber or open air molds to produce a self-sustaining three-dimensional elastomer.

Finally, it is to be understood that an acid ester plasticizing agent as described herein may be added to other liquid constituents which are incorporated into the polyurethane resin immediately prior to use of the resin. An important feature therefor of the present invention is the fact that the acid esters which have been found to be useful for plasticizing urethane resin systems are of such nature that they may be incorporated into the polyurethane at virtually any step of the resin manufacture, formulation or final use of the resin with preferred results being obtained when the addition is accomplished in either the polyol, or prepolymer, or directly in the one shot system.

EXAMPLE 1

Preferred acid ester plasticizers were compared in a filled one-shot polyurethane formulation. Two commercial plasticizers and a sample where no plasticizer was added were included in the evaluation for comparison purposes. Results were measured by testing the molded samples for hardness by durometer value in the Shore A range. The urethane formulation was made up of:

| Ingredient | % by Weight |
|---|---|
| Polypropylene glycol diol (BASF P2010) | 54.0 |
| Polypropylene glycol triol (BASF TP 726) | 4.5 |
| Calcined clay filler (Englehard & Satintone II) | 34.6 |
| Mercury catalyst (Cosdan Chemical Cocure 30) | 0.4 |
| Methylene diisocyanate (Mobay E448) | 10.0 |

The procedure utilized involved mixing the plasticizer with the polyol prior to combining the components. The concentration of the plasticizer is set out as PHR of the polyol (excluding diisocyanate) on a weight basis. The isocyanate portion was the mixed with the polyol and samples were poured to produce three dimensional self-sustaining elastomers. The samples were cured for four days at 110° F. Samples were then tested for Shore A Durometer hardness.

TABLE I

| | Shore A Durometer Hardness | | | | |
|---|---|---|---|---|---|
| Plasticizer | 0.0 PHR | 0.5 PHR | 1.0 PHR | 1.5 PHR | 2.0 PHR |
| No Additive | 51 | | | | |
| Glycerol mono-lactate | | 33 | 18 | 0 | — |
| Glycerol di-lactate | | 37 | 27 | 15 | 6 |
| Glycerol tri-lactate | | 46 | 32 | 19 | 16 |
| 1,2 propylene glycol mono-lactate | | 28 | 10 | 0 | — |
| 1,3 butylene glycol mono-lactate | | 29 | 12 | 1 | — |
| Tri-ethylene glycol mono-lactate | | 54 | 24 | 0 | — |
| Ethylene glycol mono-lactate | | 28 | 1 | — | — |
| Glycerol mono-stearate mono-lactate | | 54 | 54 | 46 | 20 |
| Glycerol mono-stearate di-lactate | | 54 | 48 | 36 | 36 |
| Ethylene glycol di-lactate | | 34 | 20 | 6 | — |
| Di-propylene glycol di-benzoate (Commercial Plasticizer) | | 55 | 58 | 58 | 55 |
| Sunthane 4240, Mineral Oil (Commercial Plasticizer) | | 60 | 60 | 58 | 57 |

Table I demonstrates that the plasticizers significantly softened the urethane elastomers to a level below the 51 Shore A durometer value obtained with respect to the no plasticizer addition sample. All of the test compounds gave lower durometer levels than the two commercial plasticizers employed in the evaluation. It was also found that for each specific polyurethane formulation, selection and concentration of a particular plasticizer enhanced production of an elastomer with the desired properties.

EXAMPLE 2

Several plasticizers were evaluated in different urethane systems to ascertain their relative effectiveness. The plasticizers were:

| Sample | Plasticizer |
|---|---|
| 1 | Glycerol mono-lactate |
| 2 | Ethylene glycol mono-lactate |
| 3 | 1,2 propylene glycol mono-lactate |
| 4 | 1,3 butylene glycol mono-lactate |
| 5 | Sunthane 4240, mineral oil, a commercial plasticizer |
| 6 | Di-propylene glycol di-benzoate, a commercial plasticizer |
| 7 | No addition of plasticizer |

The formulations evaluated were:

| Formulation | Contents | |
|---|---|---|
| A | A non-filled one-shot system with components in the same relative proportions as the formula in Example 1, but without filler. | |
| B | A high durometer one-shot polyurethane system. Plasticizer addition is PHR of total formula weight: | |
| | Ingredient | % by Weight |
| | Polypropylene glycol diol (BASF P2010) | 23.7 |
| | Polyether tetrol (BASF PEP450) | 14.9 |
| | Mercury catalyst (Cosdan Cocure 30) | 0.4 |
| | Calcined clay filler (Englehardt & Satintone II) | 20.0 |
| | Dehydrator (Mobay Baylith T) | 6.7 |
| | Methylene diisocyanate (Mobay E448) | 33.3 |
| C | Uniroyal Vibrathane 625 - A polyester based prepolymer system | |
| D | Uniroyal Vibrathane 6020U - a polyether based system | |

The plasticizers were evaluated for softening as in Example 1. The results are set out in Table II.

TABLE II

| Additive | 0.0 PHR | 0.5 PHR | 1.0 PHR | 1.5 PHR | 2.0 PHR | 4.0 PHR | 6.0 PHR | 10.0 PHR |
|---|---|---|---|---|---|---|---|---|
| Formulation A, Non-Filled One-Shot System | | | | | | | | |
| Shore A Durometer Hardness | | | | | | | | |
| 1 | | 25 | 15 | — | — | — | — | — |
| 2 | | 32 | 11 | 7 | — | — | — | — |
| 3 | | 30 | 26 | 22 | — | — | — | — |
| 4 | | 23 | 20 | 12 | — | — | — | — |
| 5 | | 40 | 41 | 41 | 40 | 38 | 34 | 21 |
| 6 | | 41 | 41 | 39 | 40 | 38 | 38 | 23 |
| 7 | 40 | | | | | | | |
| Formulation B, High Durometer One-Shot System | | | | | | | | |
| Shore D Durometer Hardness | | | | | | | | |
| 1 | | 82 | 82 | 83 | 83 | 80 | 75 | 51 |
| 2 | | 82 | 82 | 82 | 82 | 76 | 71 | 65 |
| 3 | | 82 | 82 | 82 | 82 | 80 | 78 | 71 |
| 4 | | 81 | 82 | 82 | 82 | 81 | 77 | 68 |
| 5 | | 78 | 78 | 79 | 78 | 78 | 79 | 79 |
| 6 | | 80 | 79 | 78 | 78 | 78 | 77 | 77 |
| 7 | 80 | | | | | | | |

| Additive | 0.0 PHR | 2.0 PHR | 4.0 PHR | 6.0 PHR | 8.0 PHR | 10.0 PHR |
|---|---|---|---|---|---|---|
| Formulation C, Uniroyal Vibrathane 625 (Prepolymer) | | | | | | |
| Shore A Durometer Hardness | | | | | | |
| 2 | | 75 | 43 | 12 | 9 | 5 |
| 3 | | 76 | 67 | 13 | 9 | 5 |
| 7 | 80 | | | | | |
| Formulation D, Uniroyal Vibrathane 6020U (Prepolymer) | | | | | | |
| Shore A Durometer Hardness | | | | | | |
| 2 | | 82 | 52 | 24 | 6 | 0 |
| 3 | | 82 | 77 | 43 | 30 | 23 |
| 7 | 80 | | | | | |

As in Example 1, the acid ester plasticizers show improved ability to soften these four different formulations.

EXAMPLE 3

The samples and formulations from Examples 1 and 2 were used to evaluate tensile strength at fail, tear strength and percent elongation. The test methods used for this evaluation were:

Tensile Strength: ASTM D-412 (Type C)
Tear Strength: ASTM D-624 (Type C)
Elongation: ASTM D-412 (Type C)

The results of these tests are set out in Table III.

TABLE III

Physical Properties of Plasticized Elastomers

| Plasticizer | Concentration | Shore A Durometer | Tensile lb/in$^2$ | % Elongation | Tear lb/in |
|---|---|---|---|---|---|
| A - Formulation from Example 1, Filled One-Shot System | | | | | |
| Glycerol mono-lactate | 0.5 PHR | 33 | 305.3 | 720 | 91.3 |
| Ethylene glycol mono-lactate | 1.0 PHR | 28 | 157.9 | 705 | 43.3 |
| Propylene glycol mono-lactate | 1.0 PHR | 28 | 369.5 | 418 | 109.5 |
| 1,3 butylene glycol mono-lactate | 0.5 PHR | 29 | 399.3 | 718 | 104.9 |
| Sunthane 4240 | 10.0 PHR | 48 | 384 | 524 | 68 |
| Dipropylene glycol di-benzoate | 10.0 PHR | 35 | 329 | 681 | 64 |
| No plasticizer | 0.0 | 51 | 502.8 | 277 | 121.5 |
| B - Formulation A from Example 2, Non-Filled One-Shot System | | | | | |
| Glycerol mono-lactate | 0.5 | 25 | 104.3 | 188 | 34.5 |
| Ethylene glycol mono-lactate | 0.5 | 32 | 140.1 | 380 | 36.1 |
| Propylene glycol mono-lactate | 1.0 | 26 | 84.7 | 448 | 23.3 |
| 1,3 butylene glycol mono-lactate | 0.5 | 23 | 79.2 | 383 | 24.4 |
| Sunthane 4240 | 10.0 | 21 | 62.5 | 195 | 22.5 |
| Dipropylene glycol di-benzoate | 10.0 | 23 | 60.1 | 182 | 23.2 |
| No plasticizer | 0.0 | 40 | 135.5 | 222 | 35.1 |

In A above where the formulation from Example 1 was used in a filled one-shot system, significant softening of the polyurethane is demonstrated by a lowering of the durometer readings from 51 Shore A to approximately 30 Shore A. In the case of the acid esters of the present invention, only 0.5 PHR or 1.0 PHR of the plasticizer was required while 10.0 PHR of the conventional commercial plasticizers were found to be necessary. At equivalent softness the plasticizers of this invention all performed at or better than the previously available commercial materials tested in tensile strength, % elongation, and tear strength. The best plasticizer in this application was found to be 1,3 butylene glycol mono-lactate.

In B above, the non-filled one-shot system from Example 2, the softening of the samples from 40 Shore A to approximately 25 Shore A was accomplished. The plasticizer that performed best in this application was propylene glycol mono-lactate.

Polyurethane resins plasticized with the alpha hydroxy acid esters of hydroxy polyols described herein have a wide variety of commercial and industrial applications, including use as sealants, gaskets, flexible molds, vibration mounts and dampeners and automatic components. They are used where properties such as toughness, strength and water or oil resistance are important, as well as abrasion resistance.

We claim:

1. A plasticized polyurethane comprising:
a polyurethane elastomer in self-sustaining form; and
a sufficient amount of an agent combined with the elastomer to plasticize the same, said agent being represented by the formula R—[O—CH$_2$—CH$_2$]$_n$—O—[CH(V)]$_m$—CH(Y)—O—Z wherein
R=HO—CH(X)—C(O)
X=CH$_3$ or H
Y=H or CH$_3$ or CH$_2$OH or CH$_2$OR or CH$_2$OW or CH$_3$CH$_2$
Z=H or R or W
W=CH$_3$—[CH$_2$]$_l$—[CH=C]$_p$—C(O)
V=H or CH$_3$
n=0 to 2
m=1 to 3
l=4 to 20
p=0 to 3
l+2p=4 to 20.

2. A plasticized polyurethane as set forth in claim 1 wherein X=CH$_3$.

3. A plasticized polyurethane as set forth in claim 1 wherein X=H.

4. A plasticized polyurethane as set forth in claim 1 wherein Y=CH$_2$OW, Z=H, V=H, n=0 and m=1.

5. A plasticized polyurethane as set forth in claim 1, wherein Y=CH$_2$OW, Z=R, V=H, n=0 and m=1.

6. A plasticized polyurethane as set forth in claims 4 or 5, wherein l=16 and p=0.

7. A plasticized polyurethane as set forth in claim 1, wherein Y=CH$_2$OH, Z=H, V=H, n=0 and m=1.

8. A plasticized polyurethane as set forth in claim 1, wherein Y=CH$_2$OH, Z=R, V=H, n=0 and m=1.

9. A plasticized polyurethane as set forth in claim 1, wherein Y=CH$_2$OR, Z=R, V=H, n=0 and m=1.

10. A plasticized polyurethane as set forth in claim 1, wherein Y=H, Z=H, V=H, n=0 and m=1.

11. A plasticized polyurethane as set forth in claim 1, wherein Y=H, Z=R, V=H, n=0 and m=1.

12. A plasticized polyurethane as set forth in claim 1, Y=CH$_3$, Z=H, V=H, n=0 and m=1.

13. A plasticized polyurethane as set forth in claim 1, wherein Y=CH$_3$, Z=R, V=H, n=0 and m=1.

14. A plasticized polyurethane as set forth in claim 1, wherein Y=H, Z=H, V=H, n=0 and m=2.

15. A plasticized polyurethane as set forth in claim 1, Y=H, Z=R, V=H, n=0 and m=2.

16. A plasticized polyurethane as set forth in claim 1, wherein Y=CH$_3$CH$_2$, Z=H, V=H, n=0 and m=1.

17. A plasticized polyurethane as set forth in claim 1, wherein Y=CH$_3$, Z=H, V=H, n=0 and m=2.

18. A plasticized polyurethane as set forth in claim 1, wherein Y=H, Z=H, V=H, n=0 and m=3.

19. A plasticized polyurethane as set forth in claim 1, wherein Y=CH$_3$, Z=H, V=CH$_3$, n=0 and m=1.

20. A plasticized polyurethane as set forth in claim 1, wherein Y=CH$_3$CH$_2$, Z=R, V=H, n=0 and m=1.

21. A plasticized polyurethane as set forth in claim 1, wherein Y=CH$_3$, Z=R, V=H, n=0 and m=2.

22. A plasticized polyurethane as set forth in claim 1, wherein Y=H, Z=R, V=H, n=0 and m=3.

23. A plasticized polyurethane as set forth in claim 1, wherein Y=CH$_3$, Z=R, V=CH$_3$, n=0 and m=1.

24. A plasticized polyurethane as set forth in claim 1, wherein Y=CH$_3$, Z=R, V=CH$_3$, n=0 and m=1.

25. A plasticized polyurethane as set forth in claim 1, wherein Y=H, Z=H, V=H, n=2 and m=1.

26. A plasticized polyurethane as set forth in claim 1, wherein Y=H, Z=R, V=H, n=2 and m=1.

27. A plasticized polyurethane as set forth in claim 1, wherein Y=CH$_2$OW, Z=W, V=H, n=0 and m=1.

28. A plasticized polyurethane as set forth in claim 1, wherein the agent is provided in a concentration of from about 0.1 to about 50 parts per hundred parts of polyurethane resin.

29. A plasticized polyurethane as set forth in claim 1, wherein the agent is provided in a concentration of from about 0.1 to about 20 parts per hundred parts of polyurethane resin.

30. A plasticized polyurethane as set forth in claim 1, wherein the agent is provided in a concentration of from about 0.5 to about 2 parts per hundred parts of polyurethane resin.

31. A plasticized polyurethane comprising a mono-, di- or tri-lactate or a mono-, di- or tri-glycolate of a polyhydroxy alcohol having 1 to 4 carbon atoms and wherein the alcohol contains more than one hydroxy group.

32. A plasticized polyurethane comprising a mono-, di- or tri-lactate or a mono-, di- or tri-glycolate of a condensation polymer of a polyhydroxy alcohol wherein the polymer contains at least two hydroxy groups.

33. A plasticized polyurethane comprising a mono-, di- or tri-lactate or a mono-, di- or tri-glycolate of a fatty acid ester of a polyhydroxy alcohol having 1 to 4 carbon atoms and wherein the alcohol contains more than one hydroxy group.

34. A method of improving the plasticity of a polyurethane elastomer comprising the steps of:
incorporating into a liquid quantity of the polyurethane elastomer, a sufficient amount of an agent to plasticize the same, said agent being represented by the formula R—[O—CH$_2$—CH$_2$]$_n$—O—[CH(V)]$_m$—CH(Y)—O—Z wherein
R=HO—CH(X)—C(O)
X=CH$_3$ or H
Y=H or CH$_3$ or CH$_2$OH or CH$_2$OR or CH$_2$OW or CH$_3$CH$_2$
Z=H or R or W
W=CH$_3$—[CH$_2$]$_l$—[CH=C]$_p$—C(O)

V=H or CH₃
n=0 to 2
m=1 to 3
l=4 to 20
p=0 to 3
l+2p=4 to 20;
subjecting the admixture to blending for a time to assure substantially homogeneous dispersion of the agent in the polyurethane elastomer; and
thereafter forming the plasticized elastomer into a self-sustaining body.

35. A method of improving the plasticity of a polyurethane elastomer as set forth in claim 34, wherein said agent is glycerol mono-lactate.

36. A method of improving the plasticity of a polyurethane elastomer as set forth in claim 34, wherein said additive is glycerol di-lactate.

37. A method of improving the plasticity of a polyurethane elastomer as set forth in claim 34, wherein said additive is glycerol tri-lactate.

38. A method of improving the plasticity of a polyurethane elastomer as set forth in claim 34, wherein said additive is 1,2 propylene glycol mono-lactate.

39. A method of improving the plasticity of a polyurethane elastomer as set forth in claim 34, wherein said additive is 1,3 butylene glycol mono-lactate.

40. A method of improving the plasticity of a polyurethane elastomer as set forth in claim 34, wherein said additive is tri-ethylene glycol mono-lactate.

41. A method of improving the plasticity of a polyurethane elastomer as set forth in claim 34, wherein said additive is ethylene glycol mono-lactate.

42. A method of improving the plasticity of a polyurethane elastomer as set forth in claim 34, wherein said additive is glycerol mono-stearate mono-lactate.

43. A method of improving the plasticity of a polyurethane elastomer as set forth in claim 34, wherein said additive is glycerol mono-stearate di-lactate.

44. A method of improving the plasticity of a polyurethane elastomer prepared by combining a polyol and an isocyanate comprising the steps of:
adding to the polyol prior to combination thereof with the isocyanate a sufficient amount of an agent to plasticize the elastomer, said agent being represented by the formula

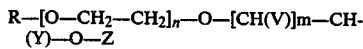

wherein
R=HO—CH(X)—C(O)
X=CH₃ or H
Y=H or CH₃ or CH₂OH or CH₂OR or CH₂OW or CH₃CH₂
Z=H or R or W
W=CH₃—[CH₂]ₗ—[CH=C]ₚ—C(O)
V=H or CH₃
n=0 to 2
m=1 to 3
l=4 to 20
p=0 to 3
l+2p=4 to 20;
subjecting the admixture to blending for a time to assure substantially homogeneous dispersion of the agent in the polyurethane elastomer; and
thereafter forming the plasticized elastomer into a self-sustaining body.

45. A method of improving the plasticity of a polyurethane elastomer prepared by combining a polyol and an isocyanate comprising the steps of:
adding to the prepolymer combination of the polyol and isocyanate prior to introduction of a compound capable of effecting curing thereof, a sufficient amount of an agent to plasticize the elastomer, said agent being represented by the formula

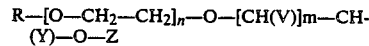

wherein
R=HO—CH(X)—C(O)
X=CH₃ or H
Y=H or CH₃ or CH₂OH or CH₂OR or CH₂OW or CH₃CH₂
Z=H or R or W
W=CH₃—[CH₂]ₗ—[CH=C]ₚ—C(O)
V=H or CH₃
n=0 to 2
m=1 to 3
l=4 to 20
p=0 to 3
l+2p=4 to 20;
subjecting the admixture to blending for a time to assure substantially homogeneous dispersion of the agent in the polyurethane elastomer; and
thereafter forming the plasticized elastomer into a self-sustaining body.

46. A method of improving the plasticity of a polyurethane elastomer prepared by combining a polyol and an isocyanate comprising the steps of:
admixing the polyol and the isocyanate;
adding to a curing compound capable of effecting cross-linking of the polyol and isocyanate, a sufficient amount of an agent to plasticize the elastomer, said agent being represented by the formula

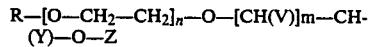

wherein
R=HO—CH(X)—C(O)
X=CH₃ or H
Y=H or CH₃ or CH₂OH or CH₂OR or CH₂OW or CH₃CH₂
Z=H or R or W
W=CH₃—[CH₂]ₗ—[CH=C]ₚ—C(O)
V=H or CH₃
n=0 to 2
m=1 to 3
l=4 to 20
p=0 to 3
l+2p=4 to 20;
subjecting the admixture to blending for a time to assure substantially homogeneous dispersion of the agent in the polyurethane elastomer; and
thereafter forming the plasticized elastomer into a self-sustaining body.

47. A method of improving the plasticity of a polyurethane elastomer prepared by combining a polyol and an isocyanate comprising the steps of:
admixing the polyol and the isocyanate with a compound capable of effecting curing thereof, and at essentially the same time, adding a sufficient amount of an agent to plasticize the elastomer, said agent being represented by the formula $$R-[O-CH_2-CH_2]_n-O-[CH(V)]_m-CH(Y)-O-Z$$

wherein
R = HO—CH(X)—C(O)
X = $CH_3$ or H
Y = H or $CH_3$ or $CH_2OH$ or $CH_2OR$ or $CH_2OW$ or $CH_3CH_2$
Z = H or R or W
W = $CH_3-[CH_2]_l-[CH=C]_p-C(O)$
V = H or $CH_3$
n = 0 to 2
m = 1 to 3
l = 4 to 20
p = 0 to 3
l+2p = 4 to 20;
subjecting the admixture to blending for a time to assure substantially homogeneous dispersion of the agent in the polyurethane elastomer; and
thereafter forming the plasticized elastomer into a self-sustaining body.

48. A method of improving the plasticity of a polyurethane elastomer prepared from a one shot polyol and isocyanate system containing a catalyst and comprising the steps of:

adding to the one shot system a sufficient amount of an agent to plasticize the elastomer, said agent being represented by the formula $$R-[O-CH_2-CH_2]_n-O-[CH(V)]_m-CH(Y)-O-Z$$

wherein
R = HO—CH(X)—C(O)
X = $CH_3$ or H
Y = H or $CH_3$ or $CH_2OH$ or $CH_2OR$ or $CH_2OW$ or $CH_3CH_2$
Z = H or R or W
W = $CH_3-[CH_2]_l-[CH=C]_p-C(O)$
V = H or $CH_3$
n = 0 to 2
m = 1 to 3
l = 4 to 20
p = 0 to 3
l+2p = 4 to 20;
subjecting the admixture to blending for a time to assure substantially homogeneous dispersion of the agent in the polyurethane elastomer; and
thereafter forming the plasticized elastomer into a self-sustaining body.

* * * * *